United States Patent [19]
Enzensberger et al.

[11] Patent Number: 6,134,128
[45] Date of Patent: Oct. 17, 2000

[54] METHOD FOR PROTECTING A HIGH-PERFORMANCE POWER CONVERTER AND A PROTECTION ARRANGEMENT FOR EXECUTING THE METHOD

[75] Inventors: Gernot Enzensberger, Wettingen; Ingo Herbst, Greifensee; Stefan Umbricht, Untersiggenthal, all of Switzerland

[73] Assignee: DaimlerChrysler AG, Stuttgart, Germany

[21] Appl. No.: 09/369,884

[22] Filed: Aug. 9, 1999

[30]    Foreign Application Priority Data

Aug. 10, 1998  [EP]  European Pat. Off. .............. 98810764

[51] Int. Cl.[7] ...................................................... H02H 7/00
[52] U.S. Cl. .................................. 363/51; 363/54; 363/58
[58] Field of Search .................................. 363/52, 56, 58, 363/50, 51

[56]              References Cited
          U.S. PATENT DOCUMENTS

| 4,331,994 | 5/1982 | Wirth ........................................ | 361/56 |
| 4,672,525 | 6/1987 | Horie et al. ................................ | 363/58 |
| 4,757,435 | 7/1988 | Wood et al. ............................... | 363/54 |
| 4,959,602 | 9/1990 | Scott et al. ............................... | 318/803 |
| 5,592,371 | 1/1997 | Rajashekara et al. ..................... | 363/98 |

FOREIGN PATENT DOCUMENTS

19626528A1  1/1998  Germany .

OTHER PUBLICATIONS

Frede Blaabjerg and John K. Pedersen, "An Integrated High Power Factor Three–phase AC–DC–AC Converter for AC–machines Implemented in one Microcontroller", Jun. 20, 1993, pp. 285–292.

*Primary Examiner*—Peter S. Wong
*Assistant Examiner*—Gary L. Laxton
*Attorney, Agent, or Firm*—Burns, Doane, Swecker & Mathis, L.L.P.

[57]              ABSTRACT

A method and apparatus for protecting a high-performance power converter. The high-performance power converter comprises a mains power converter, which converts an alternating voltage from a mains power supply into a direct voltage and supplies the direct voltage to an intermediate direct voltage circuit. The intermediate direct voltage circuit is equipped with an intermediate circuit capacitor, and includes a second power converter which converts the direct voltage from the intermediate direct voltage circuit into an alternating voltage, whereby each of the mains power converter and the second power converter is set up as a bridge circuit and each contains a number of IGBTs (Insulated Gate Bipolar Transistors) arranged in pairs in bridge arms. Protection against destruction is achieved in that, when a destructive discharge of the intermediate circuit capacitor via one of the bridge arms, which has become unintentionally continuously conductive, other bridge arms in the power converters are specifically switched through by way of a relief break-through in order to limit the destruction.

5 Claims, 4 Drawing Sheets

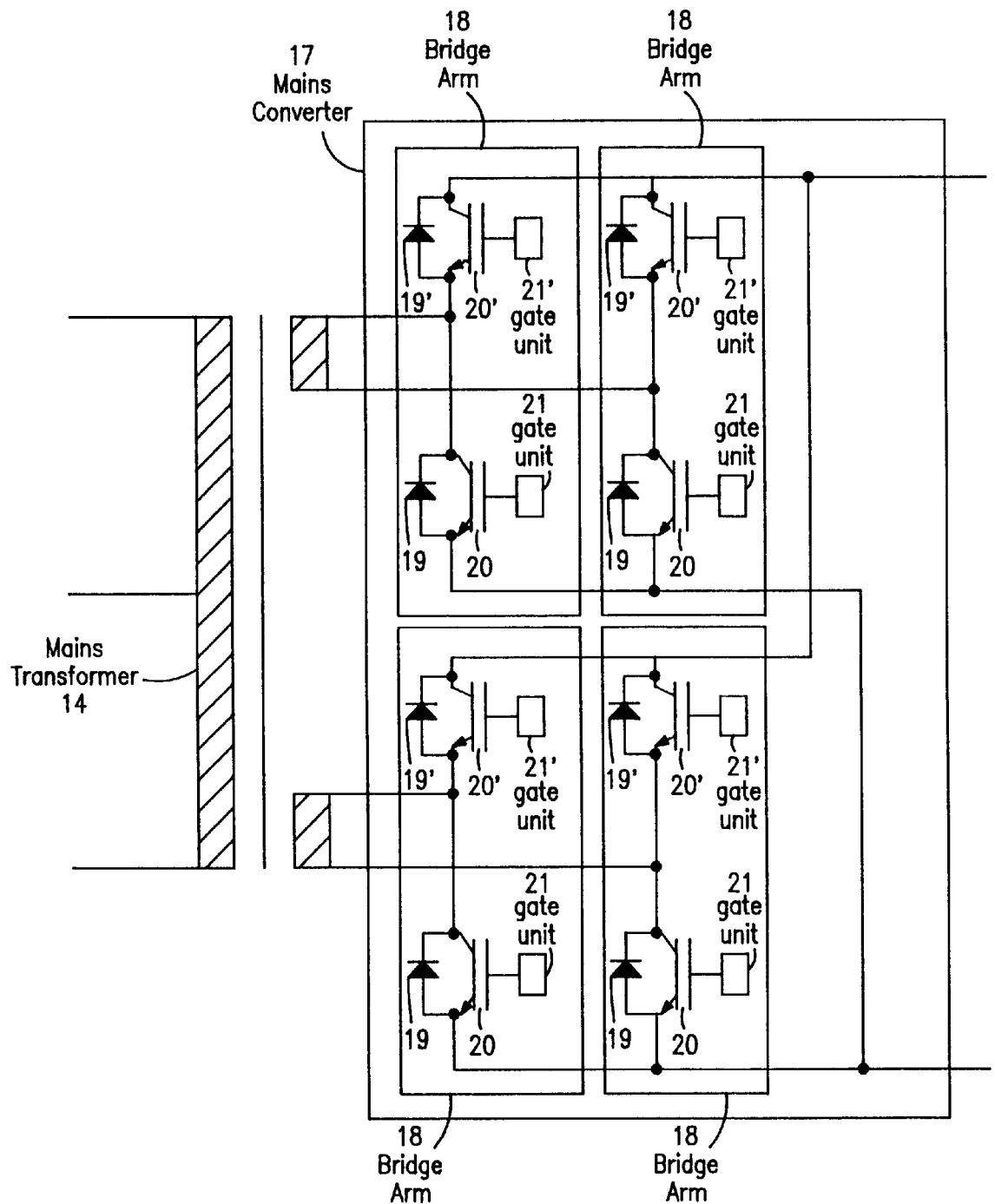
FIG. IB

METHOD FOR PROTECTING A HIGH-PERFORMANCE POWER CONVERTER AND A PROTECTION ARRANGEMENT FOR EXECUTING THE METHOD

European Patent Application No. 98 810 764.5, from which the present application claims priority under 35 U.S.C. §119, is hereby incorporated by reference in its entirety.

BACKGROUND OF THE INVENTION

1. Field of the Invention

The invention at hand relates to the field of power electronics. It concerns a method for protecting a high-performance power converter, the high-performance power converter comprising a mains power converter which converts an alternating voltage from a mains power supply into a direct voltage and supplies if. to an intermediate direct voltage circuit equipped with intermediate circuit capacitor, and comprising a second power converter which converts the direct voltage from the intermediate direct voltage circuit into an alternating voltage, whereby each of the power converters is set up as a bridge circuit and each contains a number of IGBTs (Insulated Gate Bipolar Transistors) arranged in pairs in bridge arms.

2. Background Information

High-performance power converters comprising two power converters connected with each other via an intermediate direct voltage circuit have been used for some time for motor drives in electric trains, but also for other applications. The first power converter functions as a mains converter and converts the alternating voltage with a first frequency taken from an alternating voltage supply into a direct voltage that is supplied to the intermediate direct voltage circuit. The second power converter, the motor power converter, converts the direct voltage from the intermediate direct voltage circuit into an alternating voltage with a second, also variable, frequency, which is then used to supply the motor. Such alternating voltage motor drives are known, for example, from U.S. Pat. No. 4,959,602.

Both the mains power converter and the motor power converter are usually equipped with gate turn-off power semiconductors (GTOs or IGBTs) arranged in pairs in bridge aims and connected to form a bridge circuit. An example of a motor power converter equipped with GTOs (Gate Turn-Off thyristors) is described in U.S. Pat. No. 4,672,525. An example of a motor power converter equipped with IGBTs is found in U.S. Pat. No. 5,592,371.

During normal operation, the switch pairs in the bridge arms of the power converters are never switched through at the same time. But during malfunctions both switches of a bridge arm pair may become unintentionally continuously conductive. The bridge arm then represents a short circuit for the supplied direct voltage, resulting in a high short circuit current through the bridge arm. To manage this malfunction, the above mentioned publication U.S. Pat. No. 4,672,525 suggests for a motor power converter driven from a direct voltage supply that the motor power converter's bridge arms, equipped with GTOs, be monitored individually for a short circuit (switching through of both GTOs of the arm), and in the case of a short circuit in one bridge arm, to also specifically switch through the remaining bridge arms.

Such a safety break-through causes the flowing short circuit power to be distributed over several bridge arms and switching elements, making it possible to avoid damage to the individual components (GTOs) during the initial time of the malfunction. The power converter is then separated from the direct voltage by a successive opening of a "high-speed breaker" and a (relatively inert) mechanical switch, and the short circuit power supplied by the direct voltage source can be permanently interrupted in this way (safety cutoff).

In a high-performance power converter with intermediate direct voltage circuit and IGBT as electronic switches, as the one used as a basis for this invention, a protection concept with a safety cutoff is also advantageously used due to the characteristic properties of the IGBTs. If an unintentional simultaneous conduction of the electronic switches of an arm pair occurs within such a power converter, first the intermediate circuit capacitor discharges partially or completely over the protection elements switched in series with it, and in this way more or less destroys the electronic switches. After such a burst-like discharge of the intermediate circuit during a range of about one millisecond, the intermediate circuit is short-circuited, but the intermediate circuit capacitors may not yet have been completely discharged depending on the type of the protection elements switched in series with them. The short circuit currents still flowing at this point via the still intact power converter arm pairs from the mains and the motor (the load) into the short-circuited and partially destroyed arm pair are able to significantly increase the extent of this arm pair's damage and may cause serious damage near this arm pair.

SUMMARY OF THE INVENTION

It is therefore the objective of this invention to create a method for protecting a high-performance power converter with intermediate direct voltage circuit and IGBTs as electronic switches with which, during the short circuit of an arm pair, the short-circuited arm pair is relieved from the short circuit currents coming from the mains and the load, and to describe a protection circuit for performing the method.

In accordance with an exemplary embodiment of the invention, a relief break-through is performed using several, or all, of the other bridge arms, to divert current away from the short-circuited arm pair. The relief break through can be performed, for example, by closing bridge arm circuits other than the short-circuited arm pair, so that current is diverted to flow through the other bridge arm circuits instead of through the short-circuited arm pair. Such a relief break-through is only possible and reasonable for the power converter with intermediate direct voltage circuit and IGBTs as switching elements because the capacitor of the intermediate direct voltage circuit has already been substantially exhausted by the previous burst-like discharge, so that damage to the bridge arms switched through during the relief break-through no longer must be expected.

In accordance with an exemplary embodiment of the invention, a high-performance power converter includes a mains power converter connected to an intermediate direct voltage circuit having an intermediate circuit capacitor. The mains power converter also includes a second power converter, and the mains power converter and the second power converter are each arranged as a bridge circuit and contain a plurality of IGBTs (Insulated Gate Bipolar Transistors) arranged in pairs in bridge arms. An alternating voltage from a mains power supply is converted into a direct voltage, and then supplied to the second power converter via the intermediate direct voltage circuit equipped with the intermediate circuit capacitor. The direct voltage is converted into an alternating voltage. When a destructive discharge of the intermediate circuit capacitor occurs via one of the bridge arms which has become continuously conductive, a relief break-through is performed by switching through at least one of the other bridge arms in the mains and second power converters, to limit destruction.

In accordance with an exemplary embodiment of the invention, the intermediate circuit voltage of the intermediate direct voltage circuit is measured continuously, and the other bridge arms are specifically switched through if the intermediate circuit voltage falls below a predefined threshold voltage during normal operation of the high-performance power converter. The control of the relief break-through through the intermediate circuit voltage has the advantage that bridge arms need not be monitored individually for a short circuit, and that the relief break-through actually only begins when the load in the intermediate circuit capacities has already been reduced to an extent that is not harmful to the bridge arms to be protected by the break-through.

The safe function of the relief break-through is ensured according to an advantageous further development of this embodiment in that the monitoring of the intermediate circuit voltage is redundant. In the case of a failure of one monitoring device, the protection then may be taken over by another monitoring device.

In order to prevent an unintentional relief break-through in the case that the intermediate circuit is discharged routinely and causes voltage to drop below the predefined threshold value, the other bridge arms—if there is a possibility of a routine discharge of the intermediate direct voltage circuit—are only switched through when the level falls below the threshold voltage, provided no routine discharge of the intermediate direct voltage circuit is induced simultaneously.

The protection arrangement for realizing the method according to the invention is characterized in that a voltage measuring unit for measuring the intermediate circuit voltage is arranged in the intermediate direct voltage circuit of the high-performance power converter, that first means for comparing the measured intermediate circuit voltage with a predefined threshold voltage are connected to the voltage measuring unit, and that the comparison means are in functional relationship with a controller for the power converters.

A first preferred embodiment of the arrangement according to the invention includes a voltage measuring unit that comprises several, in particular three, parallel working voltage meters in order to achieve measuring redundancy

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

FIG. 1B shows a mains power converter with two bridge arm circuits in accordance with an exemplary embodiment of the invention.

DETAILED DESCRIPTION OF THE PREFERRED EMBODIMENTS

Figure 1A:
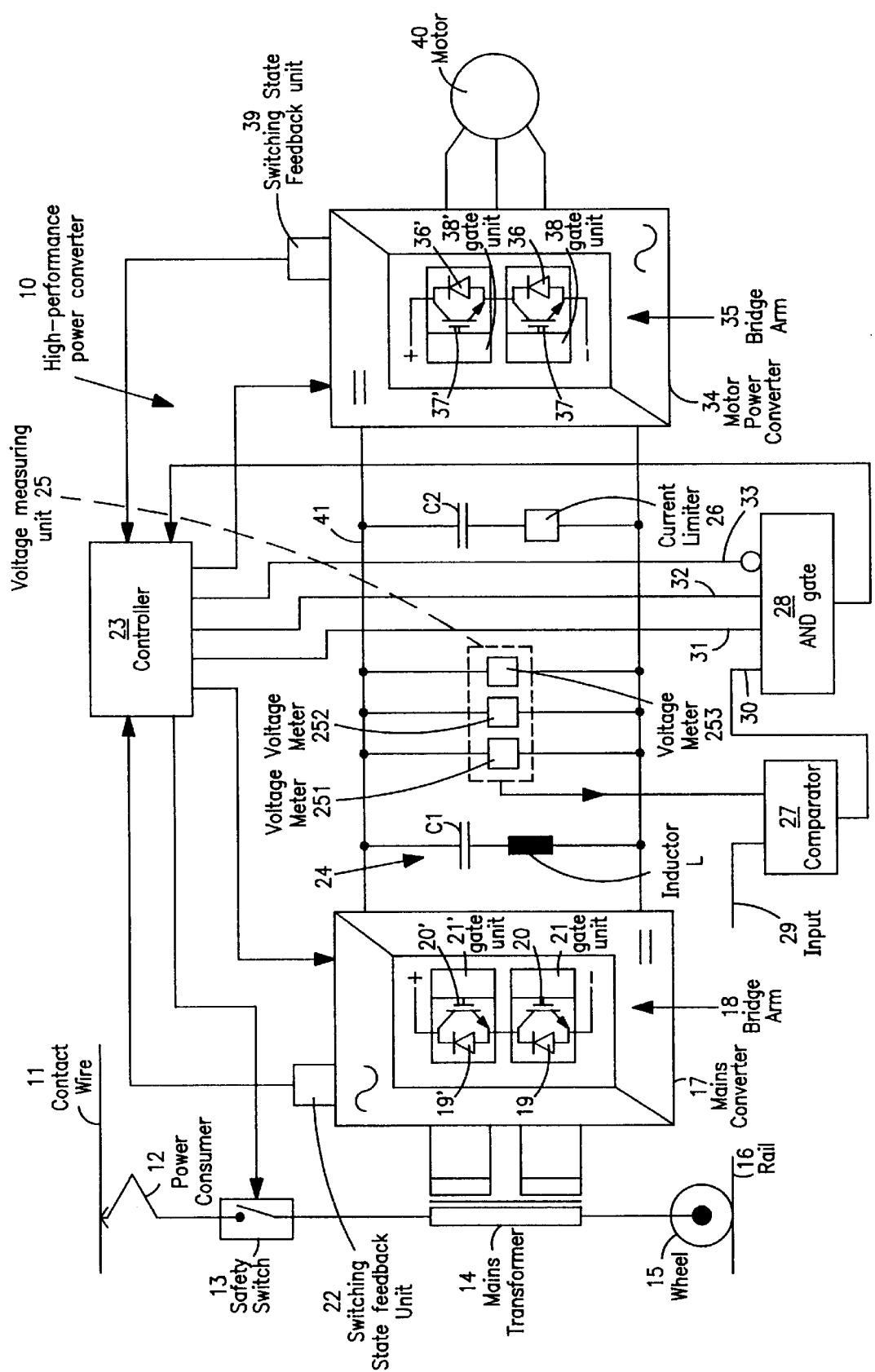
FIG. 1A shows a simplified block switching diagram of a high-performance power converter with intermediate direct voltage circuit and IGBTs as well as a protection arrangement according to a preferred embodiment of the invention.

FIG. 1A shows a simplified block switching diagram of a high-performance power converter with intermediate direct voltage circuit and IGBTs as well as a protection arrangement according to a preferred embodiment of the invention. The high-performance power converter 10 is provided for controlling and supplying a motor 40 of a train (for example an electric locomotive). The high-performance power converter 10 receives the voltage in the form of an alternating voltage from a railroad power network via a contact wire 11 and a rail 16. The connection with the contact wire 11 is made via a safety switch 13 through a power consumer 12, the connection with the rail 16 via a wheel 15. The alternating voltage taken from the railroad network is supplied via a mains power transformer 14 to the input of a mains power converter 17. The mains power converter 17 is constructed as a bridge circuit with several pairs (in this case two) of bridge arms 18, as shown for example in FIG. 1B. Each of the bridge arms 18 contains one pair of IGBTs 20, 20', each of which is connected antiparallel with a diode 19 or 19' respectively. Each IGBT 20, 20' is controlled by a gate unit 21 or 21'.

The mains power converter 17 converts the alternating voltage from the railroad network by way of a corresponding energizing of the IGBTs in the bridge aims 18 into a direct voltage which is supplied on the output side to a intermediate direct voltage circuit 41. Depending on its design, the intermediate direct voltage circuit 41 comprises different circuit elements which include, among others, capacitors. The drawing in FIG. 1A shows as an example of circuit elements an absorption circuit 24 with a serial circuit of an absorption capacitor C1 and an inductance L as well as a support capacitor C2 with a serial current limiter 26. Other circuit elements, such as, for example, voltage limiters etc. also can be provided.

Figure 1C:
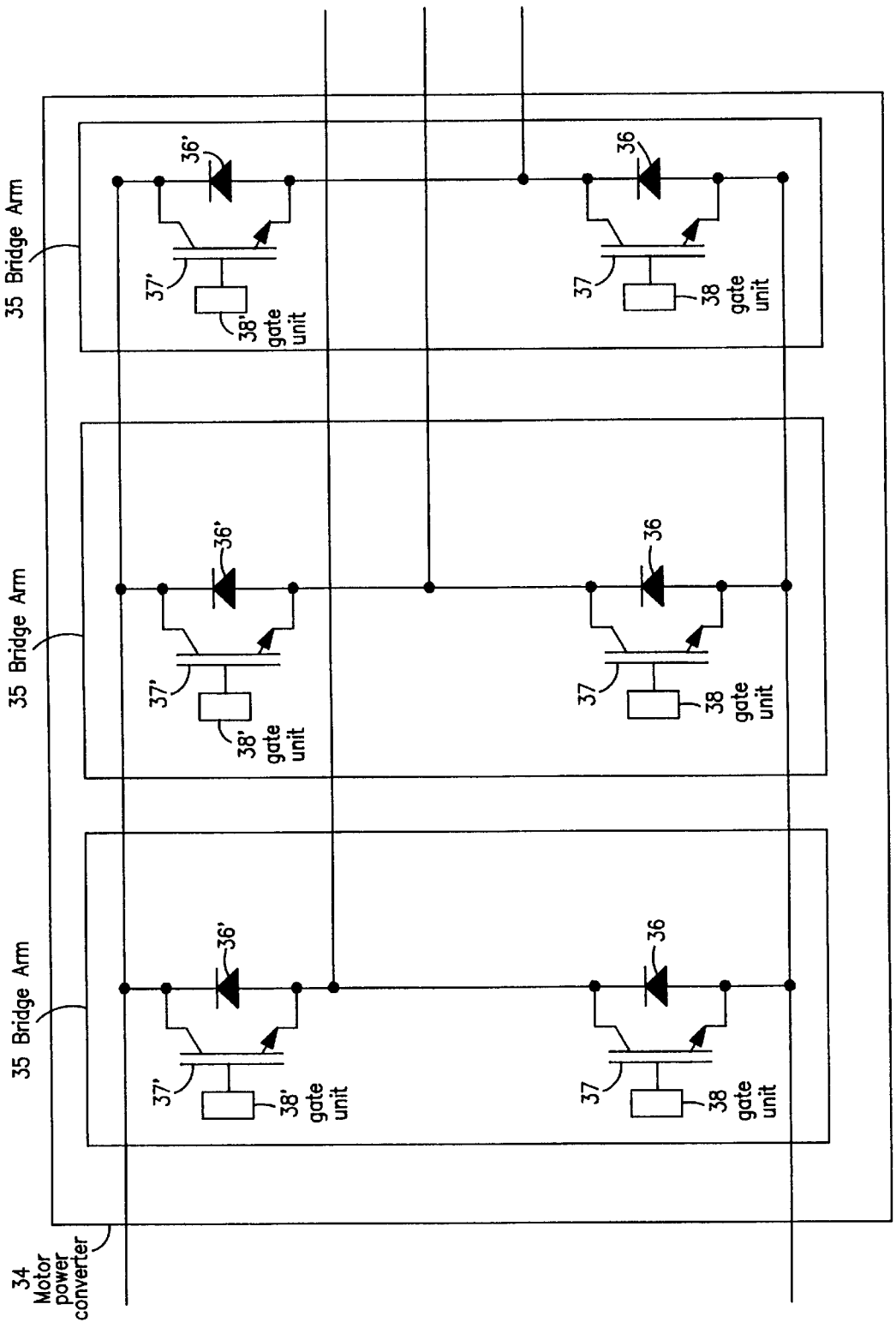
FIG. 1C shows a motor power converter with three bridge arm circuits in accordance with an exemplary embodiment of the invention.

The intermediate circuit voltage supplied to the intermediate direct voltage circuit 41 reaches the input of a motor power converter 34 that—similar to the mains power converter 17—is set up as a bridge circuit with several bridge arms 35, as shown for example in FIG. 1C. Each bridge arm 35 again uses pairs of IGBTs 37, 37' with antiparallel diodes 36, 36' and gate units 38, 38' as switching elements. The motor power convert 34 produces a three-phase alternating voltage for supplying the motor 40 from the direct voltage of the intermediate direct voltage circuit 41.

During normal operation, the power converters 17 and 34 are controlled from a controller 23 which transmits the corresponding commands to the gate units 21, 21' or 38, 38' of the individual IGBTs in the bridge arms. At the same time, each of the power converters 17, 34 is provided with switching state feedback units 22 and 39 respectively which output corresponding signals to the controller 23 if there is a malfunction in the power converter, and the controller then initiates a safety shutoff via safety switch 13.

Figure 2:
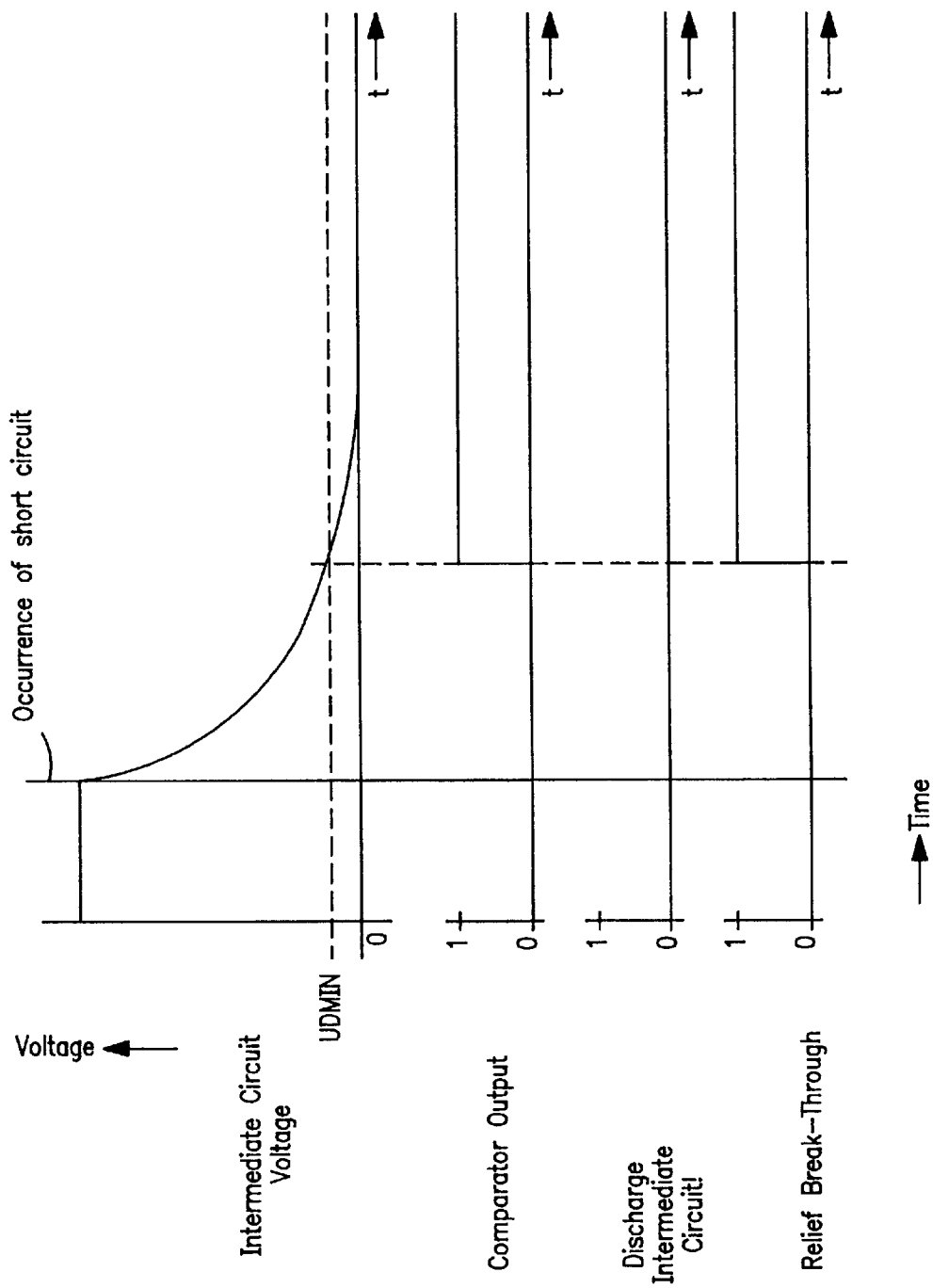
FIG. 2 shows the progression in relation to time of selected parameters during the relief break-through in an arrangement according to FIG. 1.

The controller 23 at the same time controls the relief break-through of the undamaged bridge arms in case of an unintentional short circuit in one or more of the bridge arms. The controller 23 can, for example, control the relief break-through by transmitting corresponding commands to appropriate ones of the gate units 21, 21', 38 and 38' of the individual IGBTs in the bridge arms to divert current so that the current flows through other bridge arms instead of through the short-circuited and partially destroyed bridge arm(s). If such a short circuit occurs, the support capacitor C2 discharges itself burst-like via the current limiter and the short-circuited bridge arm which may be located in one of the power converters 17 or 34. The intermediate circuit voltage (IC voltage), which is measured and monitored by a redundant voltage measuring unit 25 with three independent, parallel voltage meters 251, 252, and 253, then drops in accordance with the upper curve shown in FIG. 2 very quickly (in about 1 ms) to a level below a predefined threshold voltage UDMIN. This drop below the threshold voltage UDMIN is detected in that the measured intermediate circuit voltage is provided to an input of a comparator 27, and the threshold voltage UDMIN is provided at the other input 29 of the comparator 27. If the measured intermediate circuit voltage falls below the threshold voltage UDMIN, the output of the comparator 27 switches from logical "0" to logical "1" (second curve from top in FIG. 2). If at the instant of this switch additional conditions are fulfilled, this causes the signal for triggering the relief break-through to be issued.

One of these additional conditions is the absence of a routine discharge of the intermediate direct voltage circuit (which, after all, would also result in a value below the threshold voltage UDMIN). If a corresponding command (Discharge intermediate circuit!) does not exist (third curve from top in FIG. 2 on logical "0"), a relief break-through (RBT) may in principle be induced (bottom curve in FIG. 2). In terms of circuit elements, the query of this condition is implemented in FIG. 1A for example by an AND gate 28 to whose input 30 the output signal of the comparator 27 is transmitted, and which has another inverted input 33 to which the signal (for example from controller 23) for the routine discharge of the intermediate direct voltage circuit (Discharge intermediate circuit!) is transmitted. The relief break-though (RBT) is resolved later after a fixed, yet freely programmable time.

Additional possible conditions at additional inputs 31 and 32 of the AND gate 28 are the cycle release for the power converters 17, 34 and a general release for the relief breakthrough which both derive from the controller 23 and are forwarded to the AND gate 28. For reasons of clarity, these conditions are not shown in FIG. 2. Naturally it would also be possible to realize these conditions and decisions with a suitable software in a processor inside the controller 23.

Overall, the invention provides a protection method and a protection arrangement for a high-performance power converter which is easy to implement and provides safe protection from further damage in case of a short circuit.

It will be appreciated by those skilled in the art that the present invention can be embodied in other specific forms without departing from the spirit or essential characteristics thereof, and that the invention is not limited to the specific exemplary embodiments described herein. The presently disclosed exemplary embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. Method for protecting a high-performance power converter, wherein the high-performance power converter comprises a mains power converter connected to an intermediate direct voltage circuit having an intermediate circuit capacitor, and further comprises a second power converter, the mains power converter and the second power converter each being arranged as a bridge circuit and containing a plurality of IGBTs (Insulated Gate Bipolar Transistors) arranged in pairs in bridge arms, the method comprising the steps of:

converting an alternating voltage from a mains power supply into a direct voltage;

supplying the direct voltage to the second power converter via the intermediate direct voltage circuit equipped with the intermediate circuit capacitor;

converting the direct voltage into an alternating voltage;

when a destructive discharge of the intermediate circuit capacitor occurs via one of the bridge arms which has become continuously conductive, switching through at least one of the other bridge arms in the mains and second power converters to perform a relief breakthrough to limit destructions;

continuously measuring the intermediate circuit voltage of the intermediate direct voltage circuit; and when the intermediate circuit voltage falls below a predefined threshold voltage during normal operation of the high-performance power converter, specifically switching through the other bridge arms;

wherein the step of switching through the other bridge arms is performed only when the level drops below the threshold voltage and no routine discharge of the intermediate direct voltage circuit has been induced at the same time.

2. Method as claimed in claim 1, wherein all remaining bridge arms are specifically switched through.

3. Method as claimed in claim 1, wherein monitoring of the intermediate circuit voltage is redundant.

4. Apparatus for protecting a high-performance power converter, comprising:

a mains power converter arranged as a bridge circuit and containing a plurality of IGBTs (Insulated Gate Bipolar Transistors) arranged in pairs in bridge arms;

an intermediate direct voltage circuit connected to the mains power converter, and having a) a voltage measuring unit for measuring the intermediate circuit voltage and b) an intermediate circuit capacitor;

a second power converter connected to the intermediate direct voltage circuit, the second power converter and the mains power converter each being arranged as a bridge circuit and containing a plurality of IGBTs (Insulated Gate Bipolar Transistors) arranged in pairs in bridge arms;

a controller for controlling the mains power converter and the second power converter;

a comparator for comparing the measured intermediate circuit voltage with a predefined threshold voltage, the comparator being connected to the voltage measuring unit and to the controller; and a gate which prevents a relief break-through when the intermediate direct voltage circuit is discharged routinely.

5. Apparatus as claimed in claim 4, wherein the voltage measuring unit comprises a plurality of parallel working voltage meters in order to achieve measuring redundancy.

* * * * *